Aug. 15, 1933.     R. R. KNIGHT     1,922,442
APPARATUS FOR REMOVING SOLIDS FROM SEWAGE AND OTHER FLUIDS
Filed June 1, 1931     2 Sheets-Sheet 1

INVENTOR
R. R. KNIGHT
BY
ATTORNEYS

INVENTOR
R. R. KNIGHT
BY
ATTORNEYS.

Patented Aug. 15, 1933

1,922,442

UNITED STATES PATENT OFFICE 1,922,442

APPARATUS FOR REMOVING SOLIDS FROM SEWAGE AND OTHER FLUIDS

Raymond Rice Knight, Toronto, Ontario, Canada

Application June 1, 1931. Serial No. 541,331

4 Claims. (Cl. 210—74)

My invention relates to improvements in apparatus for removing solids from sewage and other fluids, and the object of the invention is to devise means for removing in a short space of time solids from liquid so as to prevent putrefaction particularly in the case of sewage in such a way that they will retain a minimum amount of water content permitting of their being burned readily in an incinerator or in case of trade waste being re-used to a greater advantage than would otherwise be possible, and it consists essentially of the arrangement and construction of parts as hereinafter more particularly explained.

In the drawings like letters of reference indicate corresponding parts in each figure.

Figure 1:
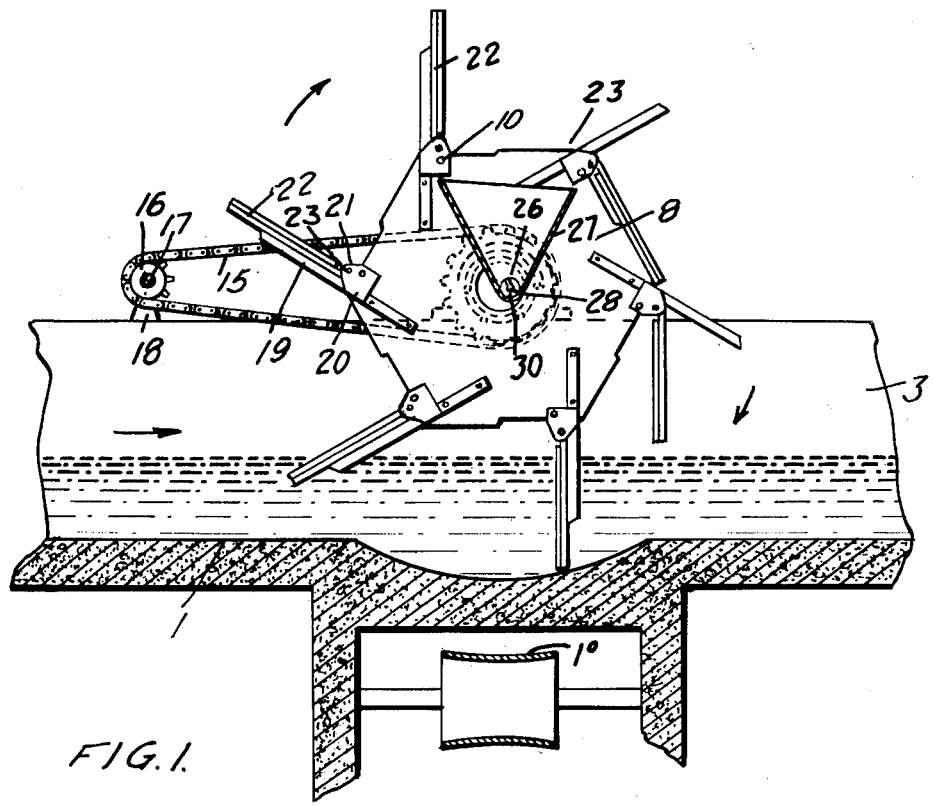
Fig. 1 is a side elevation of my apparatus showing it applied, the channel through which the sewage or other fluid flows being shown in section.
Figure 2:
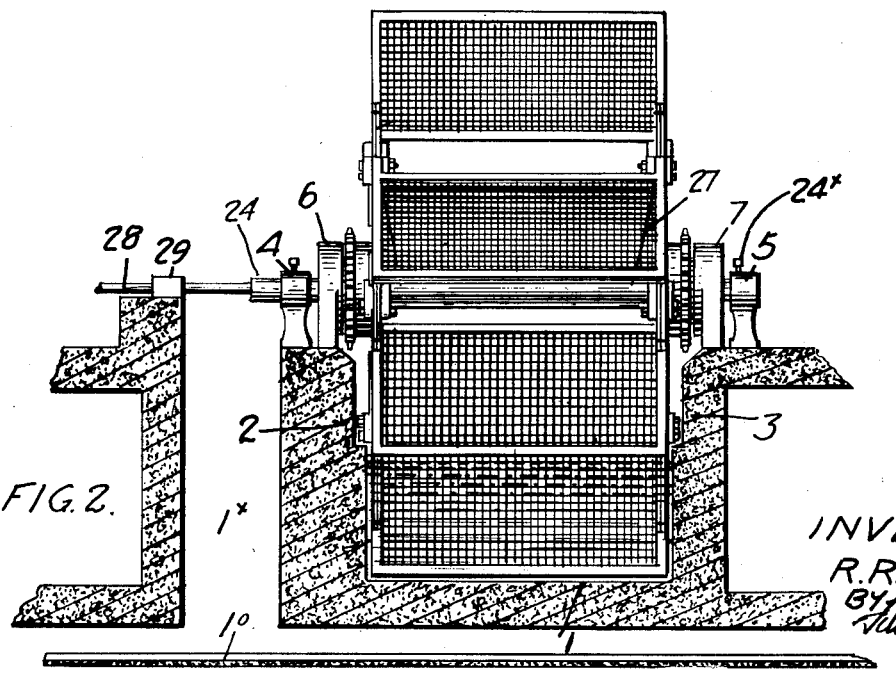
Fig. 2 is a transverse sectional view through the fluid channel showing my apparatus in elevation.

1 indicates the sewage channel provided with side walls 2 and 3 on which are mounted outer bearing members 4 and 5 and inner bearing members 6 and 7. The bearing members 6 and 7 are in the form of a sleeve bearing having an internal channel $6^x$ with a roller $7^x$. 8 and 9 are discs preferably hexagonal in form and connected together by tie rods 10 forming an open drum structure forming a screen carrier as hereinafter described.

The discs 8 and 9 are provided with central orifices $8^x$ and $9^x$ around which are secured stud members 11 and 12 forming a carrying shaft having reduced portions $11^x$ and $12^x$ fitting the bearings 6 and 7. 13 and 14 are driving gears secured to the stud members 11 and 12, such gears being driven by sprocket chains 15 extending around driving gears 16 mounted upon a counter shaft 17 carried in bearings 18 mounted upon the side walls 2 and 3 of the channel 1 or in any other convenient location. By this means the drum structure formed by the discs 8 and 9 and tie rods 10 is continuously driven.

Figure 3:
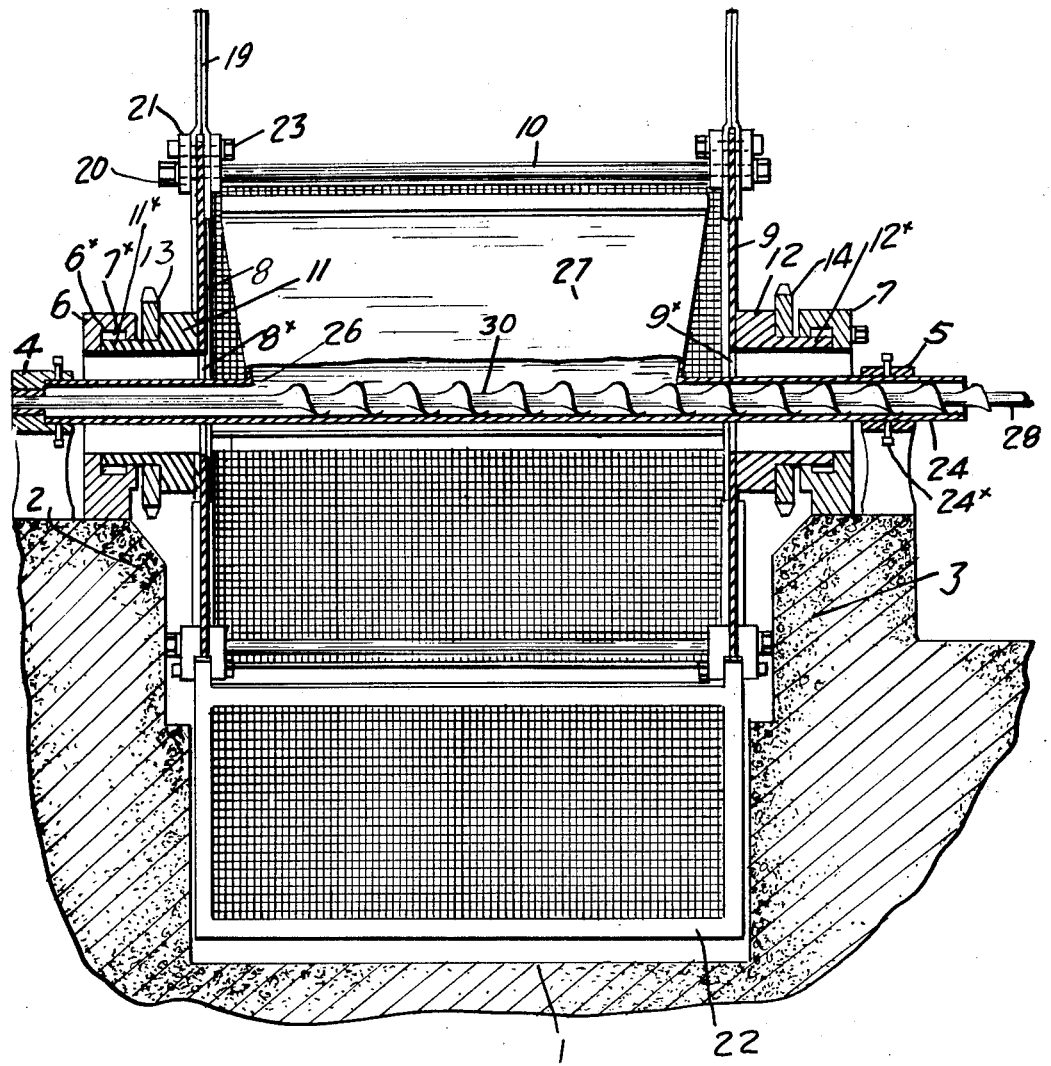
Fig. 3 is an enlarged sectional view through the major portion of my apparatus.

19 are a series of stationary arms secured to each disc 8 and 9 and extending preferably outward from each angle of the disc in a slightly tangential direction. 20 are bearing brackets secured to the discs 8 and 9 by means of the tie rods 10, such brackets being provided with outwardly extending lug portions 21 between which rectangular screen frames 22 are pivotally mounted by means of the bolts 23 as clearly indicated in Fig. 3 of the drawings.

The discs 8 and 9 and the parts carried thereby revolve in the direction of arrow as indicated in Fig. 1 or in the opposite direction to the direction of flow of the sewage through the channel 1 as indicated by arrow and the fluid flow to travel longitudinally in an opposite direction to such flow. It will thus be seen that any solids in the fluid are arrested by the screens as such screens travel therethrough, the screens being forced by the pressure of the fluid flow against the arms 19 and as the screens travel upwardly out of the fluid they are held in a rigid position by such arms.

As the screens are carried slowly upward in a circular path the excess liquid drains therefrom passing back into the fluid flow when the screens arrive in succession in a vertical position and proceed beyond this position so that the eccentric weight causes these screens to overbalance and swing downward upon their pivots formed by the bolts 22 in a horizontal position striking a bumper as indicated at 23 which is covered with rubber or other elastic material. The shock causes the material gathered upon the screens to be shaken off into a hopper provided with a discharge mechanism which I will now describe.

24 is a conveyor tube extending through the open bearings 6 and 7 and studs 11 and 12 and the orifices $8^x$ and $9^x$ of the discs 8 and 9 and substantially centrally of the frame structure. The conveyor tube 24 is held stationary by means of set screws $24^x$ extending through the bearings 4 and 5. The tube 24 is provided centrally between the discs 8 and 9 with a longitudinal slot 26 from which extends a hopper 27, the mouth of such hopper being located directly under the point of discharge of the material from the screens as they assume their horizontal position. 28 is a conveyor shaft driven from a suitable source and mounted at one end in the bearing 5 as clearly indicated in Fig. 3 and at the opposite end in a supplemental bearing 29.

30 is a screw conveyor secured to or formed integral with the shaft 28 and by which the material received in the hopper 27 is carried laterally and discharged through the open end of the tube 24 to pass downwardly through a vertical duct $1^x$ on to a belt conveyor $1^o$ to be carried to any suitable point of discharge as shown or to pass into a receptacle. The screens in succession then pass forward and swing downward on their pivots into a vertical position and as they enter the fluid flow are held rigid by being swung against the arms 19.

By this means and due to the comparatively slow travel of the screens in succession from the fluid to the position of discharge a maximum amount of liquid is drained therefrom so as to leave the material screened from the fluid in a suitable condition for burning in an incinerator or if the device is used for removing trade waste from the liquid they are in the most advantageous condition for re-use. The liquid passing through the screens can then be discharged into sedimentation tanks, settling tanks, clarifying tanks, aeration tanks or on to the filter or other equipment for the further treatment to the degree of purity into the effluent liquid desired.

My apparatus will remove most of the solids from the fluid and thus made ready for further treatment, which is surer and of shorter duration. If desired a water jet may be provided for the purpose of thoroughly cleansing the screens as they pass over the hopper and which may be an essential part of the apparatus when dealing with certain sewage or trade waste liquids. The screens may be removed conveniently and quickly for the purpose of repair and cleansing.

From this description it will be seen that I have devised a device which will be sanitary and effective in its operation and which will remove a maximum amount of solids contained in the liquids and will be quick and more effective in operation than other methods hitherto employed.

What I claim as my invention is:

1. In an apparatus for removing solids from sewage and other fluids, the combination with a substructure having a channel through which fluid is adapted to flow, of shaft members mounted in bearings carried on the substructure at each side of the channel, a drum structure mounted upon the shaft members to revolve therewith and forming a screen carrier, screen members pivotally mounted upon the carrier in suitable spaced apart positions, right angular bracket members, outwardly extending stationary screen supporting arms carried by the heads of the drum, a screen member pivotally mounted upon the drum in front of each pair of supporting arms and adapted to rest against such supporting arms during the forward and upward travel of the screens and to swing freely downward to a horizontal position during the rearward return travel of the screens, and bumper members carried by the drum structure against which the screen has impact as it assumes the horizontal position to shake the gathered material therefrom.

2. In an apparatus for removing solids from sewage and other fluids, the combination with a substructure having a channel through which fluid is adapted to flow, of shaft members mounted in bearings carried on the substructure at each side of the channel, a drum structure mounted upon the shaft members to revolve therewith and forming a screen carrier, screen members pivotally mounted upon the carrier in suitable spaced apart positions, right angular bracket members, outwardly extending stationary screen supporting arms carried by the heads of the drum, a screen member pivotally mounted upon the bumper in front of each pair of supporting arms and adapted to rest against such supporting arms during the forward and upward travel of the screens and to swing freely downward to a horizontal position during the rearward return travel of the screens, bumper members carried by the drum structure against which the screens have impact as they assume successively a horizontal position to shake the gathered material therefrom, a stationary hopper located within the drum structure adapted to receive the material discharged from the screens, and means for conveying the material laterally from within the drum to a point of discharge exterior to the drum.

3. In an apparatus for removing solids from sewage and other liquids, the combination with a channel through which sewage is adapted to flow, of a screen holder adapted to rotate over the channel in a direction opposite to the fluid flow, a plurality of screens extending transversely of said channel, a pivotal connection between each screen and the holder, means for holding each screen rigid with the holder as it moves through the liquid to gather the trash as it passes from a position beneath the holder and releasable to fall forward to a horizontal position as it assumes a position over the latter to discharge the trash.

4. An apparatus for removing solids from sewage and other liquids comprising a rotating screen holder, screens pivotally mounted thereon, means for holding the screens rigid with the holder after assuming a depending position as they pass beneath the holder to a point of release over the holder and adapted when automatically released to fall forward, and impact on the holder as they pass over the holder.

RAYMOND RICE KNIGHT.